Sept. 9, 1952  J. F. ADAMS ET AL  2,610,109
APPARATUS FOR CONDITIONING HIGH TEMPERATURE
CHEMICAL FUSION REACTIONS AND OPERATIONS
Filed July 28, 1950  2 SHEETS—SHEET 2
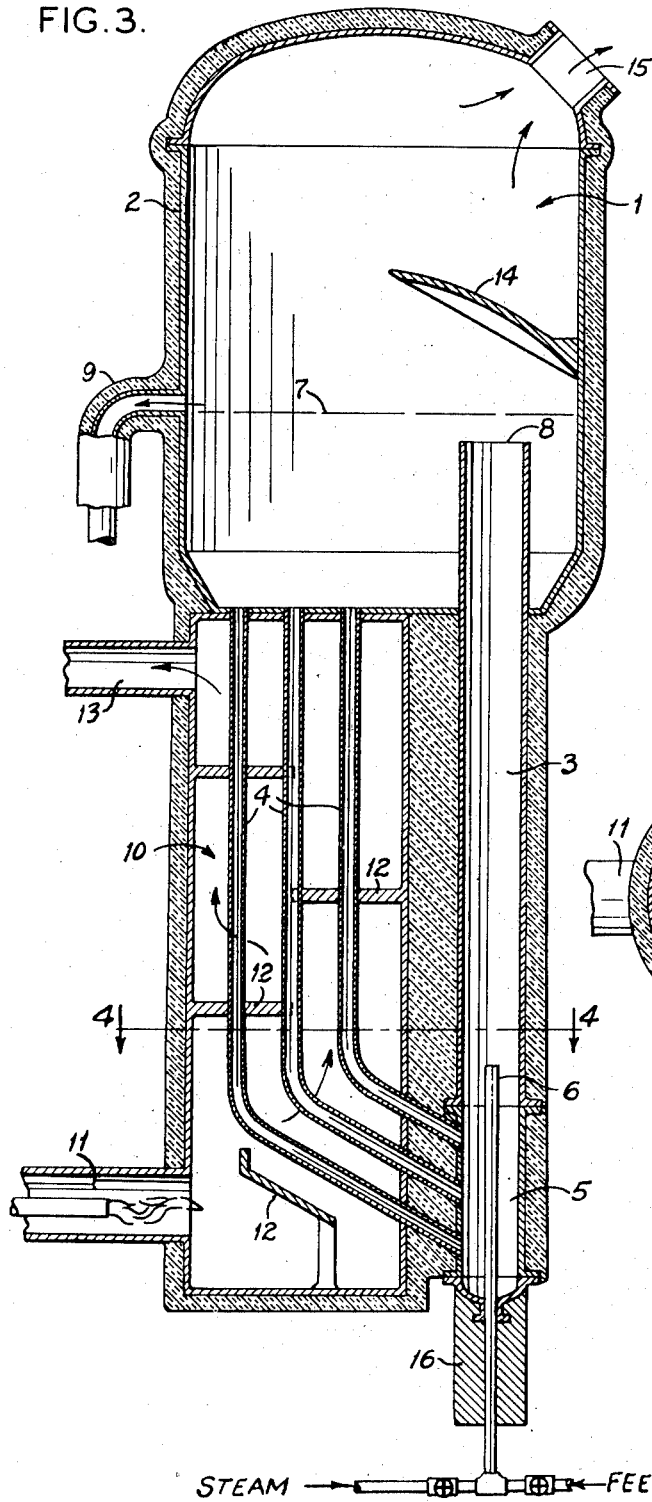
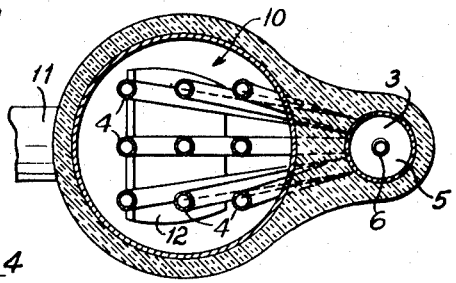
James F. Adams
Russell L. Bauer
George E. Taylor
INVENTORS
BY
Attorney Patented Sept. 9, 1952

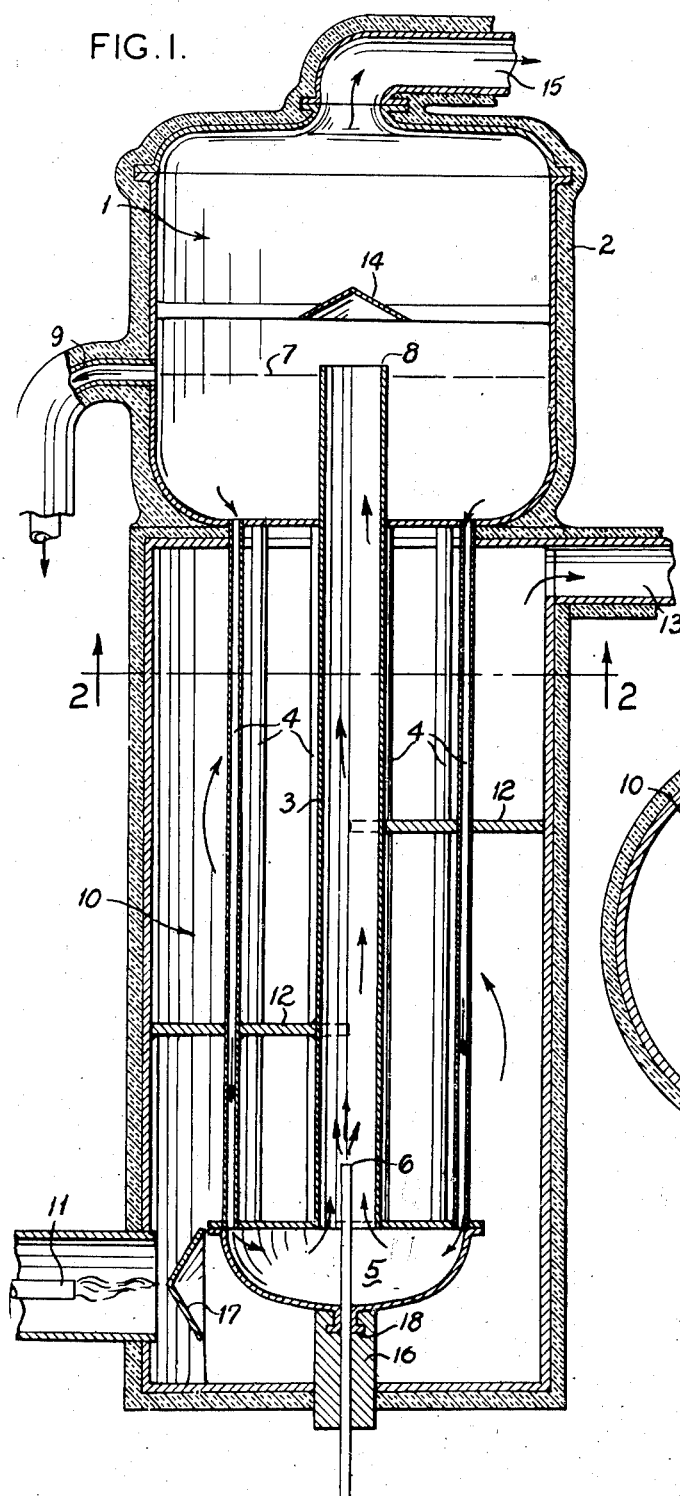
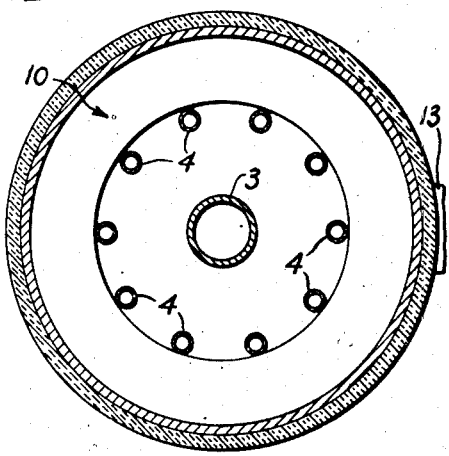

2,610,109

UNITED STATES PATENT OFFICE 2,610,109

APPARATUS FOR CONDITIONING HIGH TEMPERATURE CHEMICAL FUSION REACTIONS AND OPERATIONS

James F. Adams, St. Louis, Russell L. Bauer, Brentwood, and George E. Taylor, St. Louis, Mo., assignors to Monsanto Chemical Company, St. Louis, Mo., a corporation of Delaware Application July 28, 1950, Serial No. 176,304

2 Claims. (Cl. 23—284)

This invention relates to an improved type of apparatus or reactor for carrying out certain types of chemical process operations, particularly those process operations requiring a high rate of heat transfer at relatively high temperatures and within close limits of temperature control. The apparatus of this invention is particularly suitable for the continuous evaporation concentration of aqueous solutions of caustic alkalies to produce higher concentration caustic alkali solutions including substantially anhydrous caustic alkalies. The apparatus of this invention is also ideally suitable for continuously carrying out many fusion reactions for organic chemical synthesis wherein the fusion reaction mass is a mobile fluid body. Thus, the apparatus of this invention may be used to carry out those fusion reactions wherein at least one reactant is a fusible material which is maintained in the fused state during the reaction, or wherein the fusion reaction produces fluid mobile reaction products which are maintained in the fused state during the reaction. In addition, the apparatus of this invention may be used for continuously carrying out those reactions or organic chemical synthesis wherein steam is required as one reactant and wherein at least one reactant or a reaction product is maintained in a fused or molten state. More specifically, the apparatus of this invention is ideally suitable to carry out those fusion reactions for the preparation of certain alkali metal arylates wherein an alkali metal hydroxide in the fused or molten state is reacted with an aryl sulfonic acid or an alkali metal salt of an aryl sulfonic acid. Another type of reaction for which the apparatus of this invention is suitable is a fusion reaction embodying the simultaneous reaction of an alkali metal hydroxide, an alkali metal aryl sulfonate and an alkali metal phenolate in the presence of super-heated steam to produce one or more phenols.

It is an object of this invention, therefore, to provide an apparatus for carrying out chemical process operations as described wherein the apparatus provides for highly efficient mixing of the fusion reactants, efficient high rate of heat transfer to the chemical components and rapid and uniform flow of the chemical components across the high temperature heat transfer areas with substantial elimination of localized overheating, thereby making it possible to carry out such chemical process operations on a continuous basis.

It is a further object of this invention to provide an improved type of apparatus for continuously carrying out chemical process operations as described wherein the upper level of a fluid body may be maintained in an upper zone from which this fluid body may flow by gravity to the lower portion of a substantially vertical elongated zone, and wherein the fluid body may be heated and increased in temperature during its flow from the upper zone to the lower portion of an elongated zone by indirect heat exchange with a higher temperature heat source, and wherein this heated fluid body may be returned from the lower portion of the elongated zone to the upper zone by means of a stream of steam which is introduced into the fluid body near the lower portion of the elongated zone.

A further embodiment of this invention is to provide an apparatus wherein the upper level of a fluid body may be maintained in an upper zone from which this fluid body may flow by gravity to a heat transfer zone wherein the fluid body is heated to a high temperature by indirect heat exchange with a higher temperature heat source and then be passed by gravity from the heat exchange zone to the lower portion of a substantially vertical elongated zone from which the fluid body may be returned to the upper zone through the length of the elongated zone by injecting at lease one stream of an aqueous feed solution of one or more of the chemical components into the fluid body near the lower portion of the elongated zone, whereby the additional heat acquired by the fluid body during its passage through the heat exchange zone is used to convert the water of the organic solution into the heated steam and whereby the rapid rise of the heated steam through the elongated zone returns the fluid body to the upper zone. Where the apparatus of this invention is used for the concentration of aqueous solutions such as aqueous caustic alkali solutions, the "fluid body" consists of the caustic alkali of the desired final concentration, and the feed solution which is injected into the "fluid body" in the lower portion of the elongated zone consists of the less concentrated caustic alkali which it is desired to be concentrated. Where the apparatus is used to carry out reactions such as fusion reactions for organic chemical synthesis, the "fluid body" may be composed of fusible reactants or reaction products and the feed solution may consist of aqueous solutions of the reactants.

The advantages of such an apparatus lie in the fact that efficient mixing of the chemical components is accomplished, there is provided a high rate of heat exchange to the fluid body passing through the heat exchange zone, and there is a rapid flow of the fluid body across the heat transfer areas without the danger of localized overheating and these advantages are accomplished without the use of any auxiliary stirring, mixing or pumping equipment.

Other embodiments of this invention and objects will be apparent from the following description of apparatus of this invention.

Figures 1 and 3 are schematic drawings of vertical sections through apparatus of this invention.

Figures 2 and 4 are schematic drawings of cross sections through apparatus of this invention along section lines 2—2 and 4—4, respectively.

In Figure 1, an "upper zone" is represented by chamber 1, jacketed with an insulating material 2. A "heat transfer zone" to which a fluid material may flow, as by gravity, from the "upper zone" is represented by a plurality of substantially vertical elongated conduits 4 which are in direct heat exchange relationship with a high temperature heat source such as the hot combustion gases contained in the furnace chamber 10. The phrase "heat exchange tubes" will be used herein as descriptive of parts of an apparatus having the same function as the elongated conduits 4, namely the function of effecting heat transfer from the high temperature heat source to the fluid body.

An "elongated reaction zone" is represented by an elongated conduit 3 which is substantially vertical and located in the lower portion of chamber 1 and which has a substantially larger cross-sectional area than the total cross-sectional area of the heat exchange tubes 4. The lower extremities of the elongated heat exchange conduits 4 of the heat transfer zone and the lower extremity of the elongated reaction zone conduit 3 terminate in a common header chamber 5 whereby a fluid body may flow or pass from the heat transfer zone to the lower portion of the elongated reaction zone conduit 3. Circulatory liquid communication is therefore provided, under the proper conditions, whereby a liquid or fluid body having its upper level in chamber 1 or "upper zone" may pass from chamber 1 down through the elongated heat exchange conduits 4 of the "heat transfer zone" and thence pass through the header chamber 5 to the lower portion of the elongated reaction zone conduit 3, up through the elongated reaction zone conduit 3 and thereby returning to the chamber 1 or "upper zone."

A fluid body is maintained at a predetermined level 7 within chamber 1. The fluid body level 7 is shown as being maintained by means of an over-flow conduit 9, which also serves as a means for continuously withdrawing a portion of the fluid body containing non-volatile or non-steam distillable excess reactants or reaction products. The fluid body is maintained at a predetermined level 7 within chamber 1. The preferred level 7 is shown as being substantially coincident with the upper extremity 8 of the elongated reaction zone conduit 3, although, in the alternative, the upper extremity of the elongated reaction zone conduit 3 may be maintained above or below the level 7. Under static conditions, when chamber 1 is full of the fluid body to the desired level 7, the heat exchange tubes 4 and the header chamber 5 are also filled with the fluid body and the elongated reaction zone conduit 3 is filled with the fluid body to a level corresponding to the level 7 in chamber 1.

The heat exchange tubes 4, the elongated reaction zone 3 and the connecting header chamber 5 are shown in Figure 1 as being in direct heat exchange relationship with a high temperature heat source such as the chamber forming means 10 containing a high temperature heat transfer medium, which high temperature heat source is represented in Figure 1 as being a furnace chamber 10 containing the hot combustion gases of a gas burner 11. The high temperature heat transfer medium is distributed throughout the chamber forming means 10 and around and in contact with heat exchange tubes 4 and the elongated reaction zone 3 by means of suitable baffling means 12. A stack 13 represents an exit for the combustion gases when such gases are used as the high temperature heat source.

By means of feed inlet nozzle 6, a feed stream of an aqueous solution of chemical components is injected into the heated fluid body contained in the lower portion of the elongated reaction zone conduit 3. In the alternative, a plurality of feed inlet nozzles may be employed, each of which may inject one or more chemical components or other materials as liquids or as aqueous solutions. The feed inlet nozzles as represented by nozzle 6 may be designed in any number of fashions. The nozzle may be of the orifice type and each nozzle may eject a single or a plurality of streams of feed reactants or other materials. Each nozzle should be designed to introduce the feed streams with a velocity of at least 50 feet per second, and preferably at high velocities of the order of 50-150 feet per second. In many instances satisfactory injection of the feed stream has been accomplished by using a simple injection nozzle as the open end of a small diameter pipe. Nozzle 6 is preferably located in the lower portion of the elongated reaction zone conduit 3 and a short distance above the lower extremity of the elongated reaction zone conduit. When a single nozzle is used, the nozzle is preferably centrally located within the cross-section of the elongated reaction zone conduit; however, when more than one nozzle is employed, they are preferably symmetrically located within the cross-section of the elongated reaction zone conduit. The feed stream or streams are preferably injected into the fluid body contained in the lower portion of the elongated reaction zone conduit substantially parallel to the longitudinal axis of the elongated reaction zone conduit.

The water contained in the aqueous solutions flashes into superheated steam upon being injected into the hot fluid body contained in the lower portion of the elongated reaction zone conduit which fluid body has been previously heated during the passage of the fluid body through the heat exchange zone. This flashing action of the water of the aqueous solution deposits and intimately disperses the chemical components from the aqueous feed solution into the heated fluid body, thereby promoting substantially instantaneous fusion of the deposited reactants with the fluid body to form a fluid fusion mass, or in the case where caustic alkali solutions are being evaporated, substantially instantaneous evaporation of the water is effected. The rapid rise of the superheated steam through the length of the elongated reaction zone conduit 3, combined with the initial motion imparted to the fluid body due to the velocity of the aqueous streams injected from the inlet nozzle, results in a high velocity upward motion of the steam bubbles and the fluid body through the length of the elongated reaction zone conduit, thereby returning the fluid body to chamber 1. This rapid upward movement of the fluid body within the elongated reaction zone conduit 3 induces rapid circulation of the fluid body contained in the lower portion of chamber 1, down through the heat transfer tubes 4 into the header chamber 5 and thence into the lower portion of the elongated reaction zone conduit 3 and upwards through the elongated reaction zone conduit past nozzle 6, whereby the heated fluid body is continuously supplied immediately adjacent to the injection nozzle 6. During the passage of the fluid body through the heat transfer tubes 4, the fluid body acquires sufficient additional heat so that this heated fluid body may serve as the high temperature heat transfer medium to supply the heat requirements for the conversion of the water of the aqueous feed solutions to superheated steam and also supply the heat requirements for the fusion reaction or changes in physical states taking place within the elongated reaction zone, without cooling the fluid body below its solidifying point.

The fluid body containing the non-volatile or non-steam distillable chemical components leaves the upper extremity 8 of the elongated reaction zone conduit 3, together with a stream of superheated steam and any volatile or steam-distillable chemical components, at a considerable velocity; and therefore, a suitable provision is made for disentraining the fluid body from the stream of vaporized materials. Any one of many conventional disentraining devices may be employed, however, the upper portion of chamber 1 is shown as being provided with a suitable baffling means 14 so as to function as a disengaging zone to disentrain the fluid body from the stream of steam and any other vaporized materials, and the steam together with any other vaporized materials are then removed from the apparatus by means of vapor outlet 15, and the disentrained fluid body falls back from the baffling into the lower portion of chamber 1 to maintain the level of the fluid body at the predetermined level 7 for recirculating through the heat exchange tubes 4, and the excess of the fluid body which the operation is continuously withdrawn through may represent all or a part of the products of the over-flow outlet 9.

The design of the apparatus of Figure 1 may be modified so that the lower extremity of the elongated reaction zone terminates at about the floor level of the furnace chamber 10 and thereby placing the header chamber 5 outside of the furnace chamber. By placing the header chamber 5 below the floor of the furnace chamber, the header chamber is more readily accessible. One advantage of having the header chamber 5 within the furnace chamber is the fact that heat loss from the materials which are circulating through the header chamber 5 is materially reduced. However, if the alternative modification were desired within the header chamber 5 would be below the floor of the furnace chamber, the heat loss from header chamber 5 could be very effectively minimized by insulating the outside surface of header chamber 5.

In Figure 1, an insulation 16 is placed around that portion of the feed line 17 which passes in direct heat exchange relationship with the high temperature heat source, whereby excessive premature heating of the aqueous solutions within the feed line is avoided. Premature heating of this portion of the feed line to a high temperature may cause steam formation within the feed line which may result in improper functioning of the injection nozzle 6. This problem of premature heating of the feed line is, of course, not encountered when the lower surface of the header chamber is outside of the furnace chamber.

Figure 3 shows a further modification of the design of the apparatus of Figure 1 and Figure 3 is a vertical section through such an apparatus and Figure 4 is a cross-section view through line 4—4. In Figure 3 the elongated reaction zone conduit 3 and the header chamber 5 have been taken outside of the furnace chamber 10. In actual practice, very little, if any, heat transfer is made from the furnace chamber 10 to the fluid body through the elongated reaction zone conduit 3 or through the header chamber 5. The placing of the elongated reaction zone conduit 3 within the furnace chamber accomplishes the purpose of reducing the heat loss from the material within the elongated reaction zone conduit. However, one embodiment of this invention resides in an apparatus where the heat exchange tubes 4 are within the furnace chamber 10 and the elongated reaction zone conduit and the header chamber 5 are placed outside of the furnace chamber 10 and well insulated to prevent heat loss.

In Figure 1, the header chamber 5 was used to provide liquid communication between the lower extremities of the heat exchange tubes 4 and the lower portion of the elongated reaction zone conduit 3. However, in Figure 3, the lower extremities of the heat exchange tubes 4 actually terminate in the lower portion of the elongated reaction zone conduit 3, and header chamber 5 of Figure 3, therefore, may be considered as being the lower portion of the elongated reaction zone conduit 3 rather than as a separate and distinct chamber. For large scale operations, an apparatus within the scope of this invention may be designed having more than one elongated reaction zone conduit, and a plurality of several hundred heat exchange tubes 4.

In the types of apparatus as represented in Figures 1 and 3, instead of using combustion gases as the high temperature heat transfer medium, chamber 10 may be modified so as to receive high temperature vapors from some other source, as for example, the design of chamber 10 may be modified so as to receive mercury vapors from a mercury boiler and the mercury vapors passing in contact with the heat exchange tubes 4 would serve as the high temperature heat source to provide the additional heat to be transferred to the fluid body passing through the heat exchange tubes 4. On the other hand, the heat exchange tubes may be heated by radiant energy or a combination of radiant and convection heat if so desired.

The apparatus of this invention may be used most advantageously where the continuous chemical process operation requires that the fluid body be maintained at relatively high temperatures of the order of 200 to 450° C. within close temperature limits such as ±5° C. and which also requires a high rate of heat transfer to the fluid body to maintain the temperature of the fluid body at these relatively high temperatures and within the required limits of temperature variation without localized overheating of the fluid body which would result in thermal decomposition of organic chemical components. Organic chemical fusion reactions are examples of reactions which require such conditions. The evaporation of aqueous solutions of caustic alkalies to produce substantially anhydrous caustic alkalies are examples of operations which require that the temperature of the fluid body be maintained at temperatures of the order of 350–450° C. and which require a high rate of heat transfer to permit continuous operations.

This application is a continuation-in-part of copending application Serial Number 102,512, filed July 1, 1949.

What is claimed is:

1. An apparatus for high temperature fusion-type reactions comprising, in combination, a closed chamber having a plurality of substantially vertical elongated heat exchange conduits communicating with said chamber and integral with the bottom of said chamber whereby the bottom of said chamber functions as a tube sheet, said plurality of heat exchange conduits depending from the bottom of said chamber and into a furnace chamber wherein said plurality of heat exchange conduits are in direct heat exchange relationship with a high temperature heat source, said closed chamber also having at least one vertical elongated conduit of a substantially larger diameter than said heat exchange conduits and the larger diameter elongated conduit cross-sectional area being greater than the total of the cross-sectional areas of the said heat exchange conduits, said larger diameter conduit depending from the bottom of the said closed chamber and also extending upwardly and entering the lower portion of said chamber and communicating with and terminating within said closed chamber above the upper extremities of said heat exchange conduits, means for providing fluid communication between the lower extremities of said heat exchange conduits and the lower extremity of said larger diameter elongated conduit, said larger diameter elongated conduit also having at least one feed inlet nozzle positioned in the lower extremity of said larger diameter elongated conduit and extending upwardly and terminating within the lower portion of said larger diameter elongated conduit, the longitudinal axes of each of the said feed inlet nozzles being substantially parallel to the longitudinal axis of the larger diameter elongated conduit in which it is positioned, conduit means located in said closed chamber and adapted to remove liquid materials from said chamber while maintaining a level of liquid materials within said chamber above the upper extremities of said heat exchange conduits communicating with said chamber and conduit means located in the upper portion of said chamber adapted to remove gaseous and vaporous materials from the upper portion of said chamber above the level of liquid materials within said chamber.

2. An apparatus as described in claim 1, wherein the larger diameter elongated conduit total cross-sectional area is at least twice the total of the cross-sectional areas of the plurality of heat exchange conduits.

JAMES F. ADAMS.
RUSSELL L. BAUER.
GEORGE E. TAYLOR.

REFERENCES CITED

The following references are of record in the file of this patent:

UNITED STATES PATENTS

| Number | Name | Date |
|---|---|---|
| 2,386,681 | Hadden | Oct. 9, 1945 |